United States Patent [19]
Izawa et al.

[11] Patent Number: 4,754,335
[45] Date of Patent: Jun. 28, 1988

[54] FACSIMILE APPARATUS

[75] Inventors: Shoji Izawa, Shizuoka; Eizou Kishikawa, Tokyo, both of Japan

[73] Assignee: Tokyo Electric Co., Ltd., Tokyo, Japan

[21] Appl. No.: 43,193

[22] Filed: Apr. 27, 1987

[30] Foreign Application Priority Data

May 8, 1986 [JP] Japan .................................. 61-105191

[51] Int. Cl.$^4$ ............................................. H04M 1/00
[52] U.S. Cl. .................................... 358/256; 358/257; 358/280; 358/286; 379/100
[58] Field of Search ................ 358/256, 257, 280, 286, 358/293; 379/100, 110

[56] References Cited

U.S. PATENT DOCUMENTS

| | | | |
|---|---|---|---|
| 4,113,993 | 9/1978 | Heckman et al. | 358/280 |
| 4,646,160 | 2/1987 | Iizijka | 358/257 |

FOREIGN PATENT DOCUMENTS

| | | | |
|---|---|---|---|
| 0188865 | 6/1986 | European Pat. Off. | 379/100 |
| A20195258 | 9/1986 | European Pat. Off. | |
| A13439867 | 5/1985 | Fed. Rep. of Germany | |
| 58-31659 | 2/1983 | Japan | 358/286 |
| 58-187066 | 11/1983 | Japan | 358/286 |
| 59-117369 | 7/1984 | Japan | 358/286 |
| 59-216356 | 12/1984 | Japan | 379/100 |
| 60-70867 | 4/1985 | Japan | 358/256 |
| 60-134552 | 7/1985 | Japan | 379/100 |
| 60-162371 | 8/1985 | Japan | |

OTHER PUBLICATIONS

Panafax, Corp., "Facsimile Machine/Model UF-400AD", *Telephony*, vol. 209, No. 16, p. 108.
Kokai No. 59-101956-Patent Abstracts of Japan-Section E, vol. 8, No. 217, Oct. 4, 1984, p. 125 E 270.
Kokai No. 61-25368 Patent Abstracts of Japan-Section E, vol. 10, No. 175, Jun. 20, 1986, p. 112 E 413.

*Primary Examiner*—Edward L. Coles, Sr.
*Attorney, Agent, or Firm*—Frishauf, Holtz, Goodman & Woodward

[57] ABSTRACT

A facsimile apparatus is disclosed, which comprises a memory having a plurality of memory areas each storing telephone number data, broadcast group data, or polling group data; a key-in unit for selectively designating memory areas of the memory; a control unit for executing a broadcasting or a polling function when broadcast group data or polling group data is selected by the key-in unit. Each item of the broadcast group data or polling group data has a specific discrimination code. The telephone number data, the broadcast group data, or the polling group data are selectively stored in the memory. When the broadcast group data or the polling group data is designated by the key-in unit, the control unit executes the broadcasting or polling function, based on the plurality of telephone number data items assigned to the discrimination codes which are contained in the broadcast group data or polling group data designated.

16 Claims, 8 Drawing Sheets

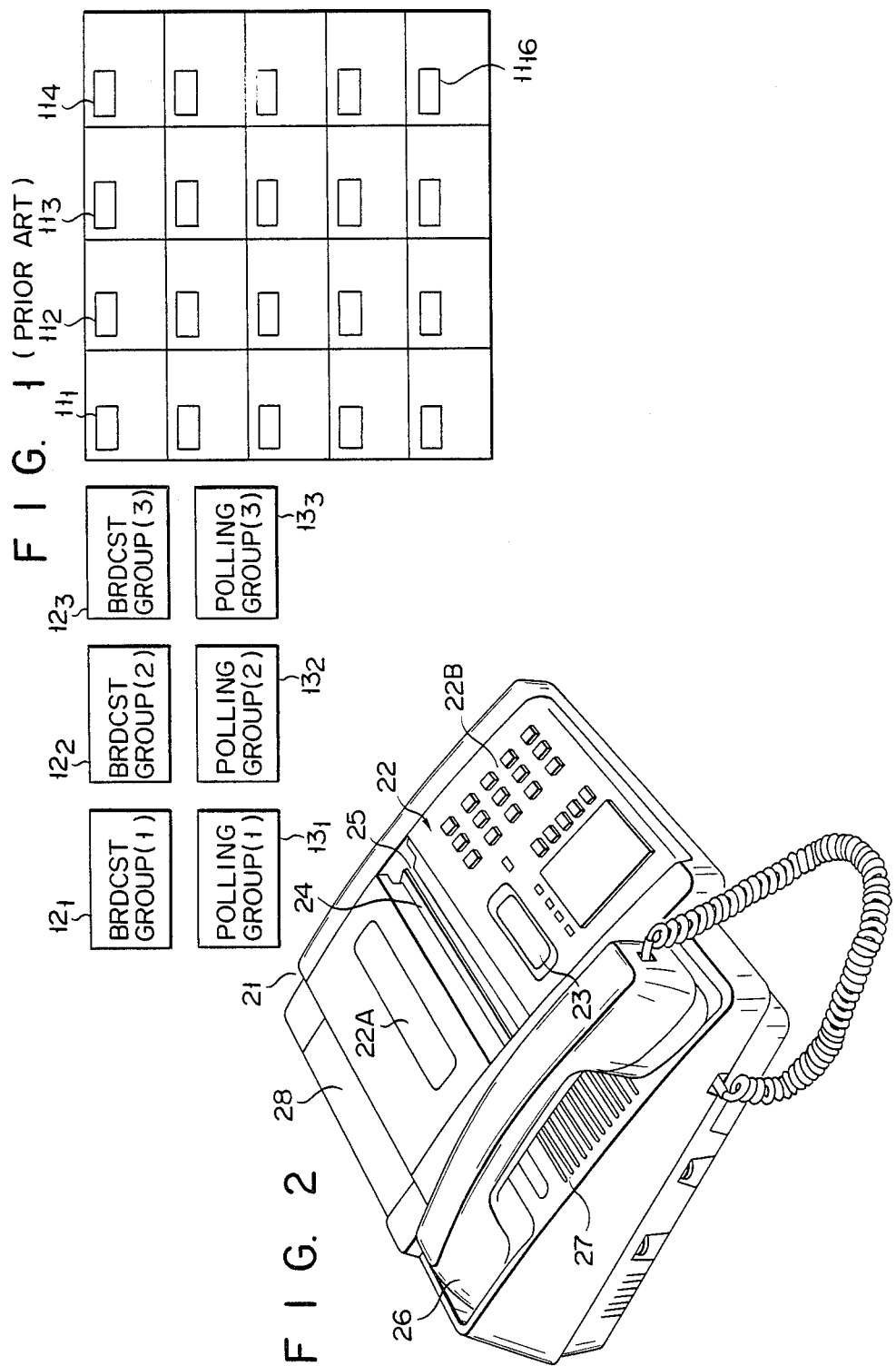

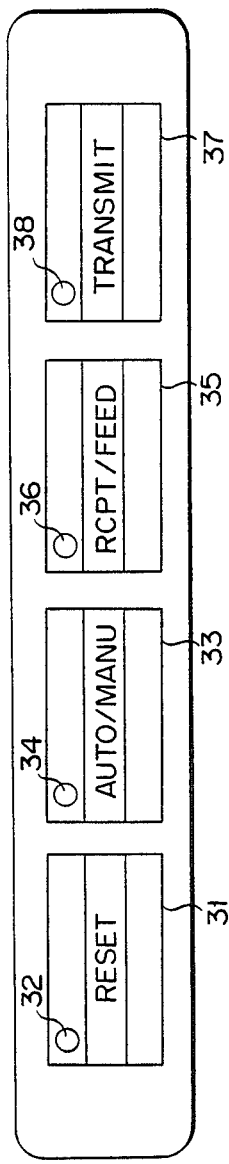
F I G. 3
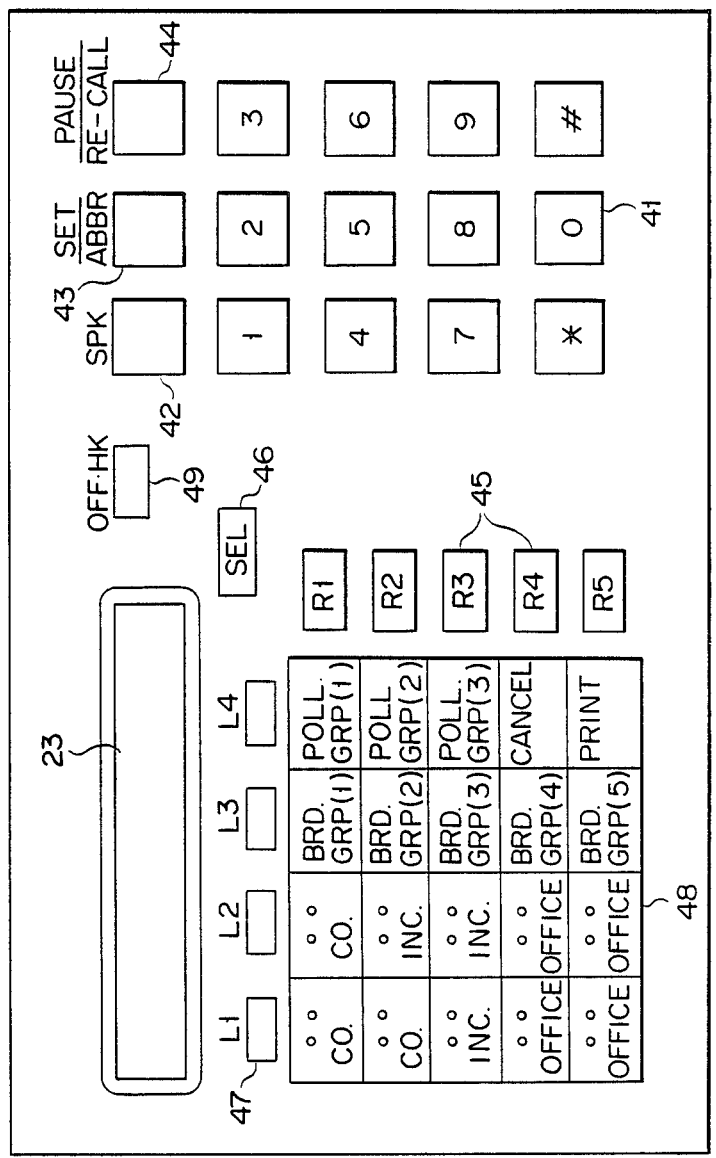
F I G. 4

FIG. 6

Table 71:

| | |
|---|---|
| L1 × R1 | TELEPHONE NO. |
| L1 × R2 | TELEPHONE NO. |
| L1 × R3 | TELEPHONE NO. |
| L1 × R4 | TELEPHONE NO. |
| L4 × R2 | GROUP (1) POLLING INF. |
| L4 × R3 | GROUP (2) POLLING INF. |
| L4 × R4 | GROUP (3) POLLING INF. |
| L4 × R5 | BROADCAST CANCEL INF. |
| L4 × R5 | IMAGE PRINT INF. |

Table 72:

| ABBR NO. | TELEPHONE NO. |
|---|---|
| 00 | ------ |
| 01 | ------ |
| 02 | ------ |
| 03 | ------ |
| 04 | ------ |
| 45 | ------ |
| 46 | ------ |
| 47 | ------ |
| 48 | ------ |
| 49 | ------ |

Table 73:

| BRD GRP(1) | BRD GRP(2) | BRD GRP(3) |
|---|---|---|
| 00 | 01 | 02 |
| 03 | 03 | 04 |
| 06 | 07 | 05 |
| 12 | 08 | 08 |
| 13 | 10 | 09 |
| 42 | | |

Table 74:

| POLL GRP(1) | POLL GRP(2) | POLL GRP(3) |
|---|---|---|
| 01 | 11 | 00 |
| 03 | 14 | 04 |
| 04 | 15 | 07 |
| 07 | 21 | 08 |
| 09 | 24 | 10 |

F I G. 9

| o o CO. | o o CO. | BRD GRP(5) | POLL GRP(3) |
|---|---|---|---|
| o o INC. | o o INC. | BRD GRP(6) | POLL GRP(4) |
| o o OFFICE | o o OFFICE | BRD GRP(7) | BRD GRP(5) |
| BRD GRP(1) | BRD GRP(3) | POLL GRP(1) | CANCEL |
| BRD GRP(2) | BRD GRP(4) | POLL GRP(2) | PRINT |

FACSIMILE APPARATUS

BACKGROUND OF THE INVENTION

This invention relates to a facsimile apparatus having at least a broadcast function or a polling function.

A facsimile apparatus is known which has a keyboard with a layout comprising various keys, as is shown in FIG. 1. The keyboard contains a plurality of one-touch dial keys $11_1$, $11_2$, ... $11_{16}$, a plurality of broadcast group designation keys $12_1$, $12_2$, and $12_3$ for designating broadcast groups, and a plurality of polling group designation keys $13_1$, $13_2$, and $13_3$ for designating polling groups. The group designation keys are arranged separately from one-touch dial keys $11_1$, $11_2$, and $11_3$. When one of one-touch dial keys $11_1$, $11_2$, ... $11_{16}$ is operated, the telephone number of a called party, which has previously been set to correspond to the operated key, is designated, and a dial signal is transmitted to the party being called. In response to this signal, the facsimile communication with the other party commences. When one of broadcast group designation keys $12_1$, $12_2$, and $12_3$ is operated, the corresponding broadcast group is designated. Based on the data relating to a plurality of telephone numbers contained in the broadcast group, dial signals are automatically and sequentially transmitted. The same image data previously stored in the memory is then transmitted to a plurality of designated parties, in a predetermined order. When one of polling group designation keys $13_1$, $13_2$, and $13_3$ is operated, the corresponding polling group is designated. Based on the plurality of telephone number data items contained in the polling group, dial signals are transmitted automatically and sequentially, the image data from a plurality of called parties are then received in a predetermined order, and are printed out by a printer, for example.

This type of facsimile apparatus comprises a large number of keys to be used for various purposes, and thus, the keyboard section occupies a large area. This invariably hinders any attempts at size reduction of the facsimile apparatus, and it is impossible for the user to further increase the number of exclusive keys.

SUMMARY OF THE INVENTION

An object of this invention is to provide a facsimile apparatus having either a broadcast function or a polling function, which can be reduced in size by decreasing the number of keys used.

To achieve the above object, a facsimile apparatus is provided comprising a first memory having a plurality of memory areas each selectively storing telephone number data or telephone number group data containing a discrimination code; a first key-in unit for selectively designating the memory area of the first memory; a second memory for storing at least one item of telephone number group data, and a plurality of data items corresponding to the telephone number group data; and a control unit which, when it detects that one of the memory areas of the first memory, which stores the telephone number group data, is designated, sequentially reads out telephone number data from the second memory, based on the discrimination code contained in the selected telephone number group data, transmits a dial signal based on the read-out telephone number data, and allows the transfer of image data with respect to the called party designated by the telephone number data.

According to this invention, the telephone number data, and at least the broadcast group or polling group data are selectively stored in a plurality of memory areas of the first memory. Thus, the broadcast or the polling group is selected by operating a one-touch dial key, and the broadcast or polling function can be executed based on the telephone number data which corresponds to the selected group. Additionally, the first memory can be effectively used.

BRIEF DESCRIPTION OF THE DRAWINGS

FIG. 1 shows a layout of keys on the keyboard of a prior art facsimile apparatus;

FIG. 2 is a perspective view of an embodiment of a facsimile apparatus according to this invention;

FIG. 3 shows a facsimile operation panel of the facsimile apparatus shown in FIG. 2;

FIG. 4 shows a telephone operation panel of the facsimile apparatus;

FIG. 6 shows a memory map of a RAM used for the facsimile apparatus shown in FIG. 5;

FIG. 9 shows an example of key data display board.

DETAILED DESCRIPTION OF THE PREFERRED EMBODIMENT

Figure 5:
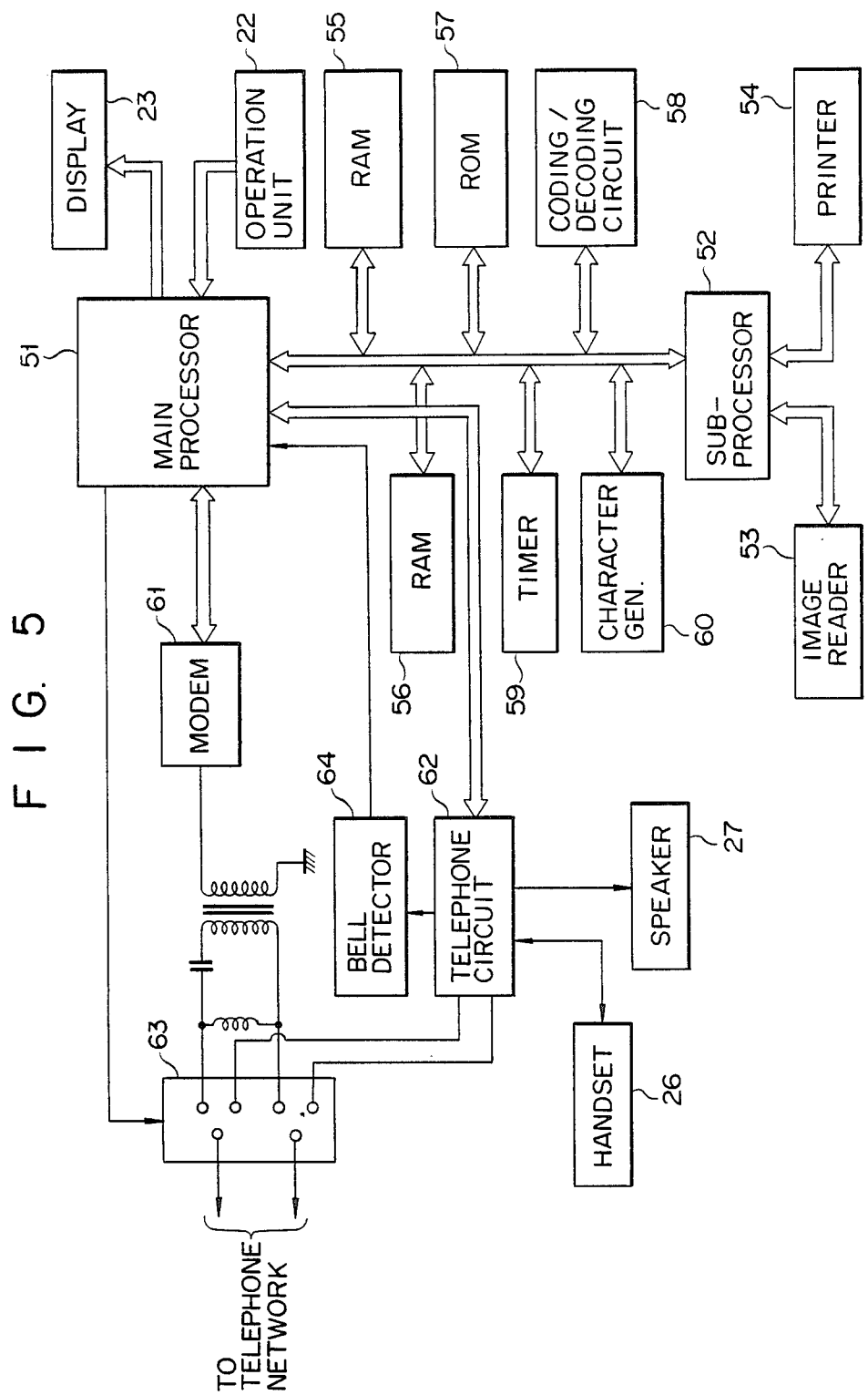
FIG. 5 is a block diagram of the facsimile apparatus.

FIG. 2 shows an external view of an embodiment of a facsimile apparatus according to this invention. The facsimile apparatus comprises frame 21, operation unit 22, display 23, document outlet 24, copy outlet 25, handset 26, speaker 27, and document inlet 28. Operation unit 22, document outlet 24, and copy outlet 25 are provided on the top surface of frame 21. Handset 26 and speaker 27 are provided on the left portion of the top surface. Document inlet 28 is provided on the rear surface of frame 21. Operation unit 22 comprises facsimile operation panel 22A and telephone operation panel 22B.

As is shown in FIG. 3, facsimile operation panel 22A of operation unit 22 comprises combinations of RESET key 31 and alarm lamp 32, AUTO/MANU key 33 and AUTO lamp 34, and TRANSMIT key 37 and TRANSMIT lamp 38. Each key contains an associated lamp incorporated into it.

As is shown in FIG. 4, telephone operation panel 22B of operation unit 22 comprises twelve telephone keys 41, speaker key 42, SET/ABBR key 43, PAUSE/RECALL key 44, five one-touch dial keys 45 (R1 to R5), select key 46, four one-touch column indication lamps 47 (L1 to L4), one-touch key data display board 48, and off-hook indication lamp 49. Telephone keys 41 are ten keys "0" to "9", asterisk key "*", and number key "#".

Each time select key 46 is operated, one-touch column indication lamps 47 are sequentially and circulatively lit in the order of L1, L2, L3, L4, and L1. Under this condition, if one of one-touch dial keys 45 is pushed, the column containing the lighting lamp is designated. For example, if key R1 is operated, when lamp L3 is selected by select key 46, broadcast data of group (1) is designated. With the combination of five one-touch dial keys 45 and four one-touch column indication lamps 47, twenty one-touch data items can be selected. The one-touch data for selection is stored in a one-touch dial memory to be described later.

Display 23 is of a liquid-crystal type, for example. It displays a telephone number dialed, a designated broadcast group, a designated polling group, time, necessary messages, and the like.

FIG. 5 is a block diagram illustrating a circuit configuration of an embodiment of the facsimile apparatus according to this invention. The facsimile apparatus comprises main processor 51 and sub-processor 52. Main processor 51 constitutes a main control section. Subprocessor 52, which is controlled by main processor 51, controls image reader 53 and printer 54 as a recording device. Image reader 53 optically reads image such as characters and numerals on the document inserted from document inlet 28, and converts them into electrical signals.

Main processor 51 is connected to operation unit 22, display 23, RAMs 55 and 56, ROM 57, image data coding/decoding circuit 58, timer 59, and character generator 60. RAM 55 has various memories which are used for controlling facsimile communication. RAM 56 is for recording an image, and stores image data used for broadcast. ROM 57 stores program data and the like. Timer 59 counts the date and time.

Main processor 51 is further connected to modem 61 for facsimile (FAX) and telephone circuit 62.

Telephone circuit 62 is connected to a telephone network via first contacts of paired contacts of switch circuit 63. Telephone circuit 62 is connected to bell detector 64. When a call signal is input to telephone circuit 62 via the telephone network, bell detector 64 detects the call signal and supplies an output signal to main processor 51. Telephone circuit 62 is also connected to handset 26 and speaker 27.

Modem 61 is connected to the telephone network via the second contacts of the paired contacts of switch circuit 63.

As is shown in FIG. 6, RAM 55 comprises one-touch dial memory 71, abbreviated number memory 72, broadcast group memory 73, and polling group memory 74. Memory 71 has twenty memory areas each storing one-touch data. The memory area of memory 71 is addressed by one-touch dial key 45 and one of one-touch column indication lamps 47 which is lit by select key 46. Memory 72 stores fifty combinations of telephone numbers and their abbreviated number. Memory 73 has ten group memories, each of which can store a maximum of fifty abbreviated numbers as a broadcast group. Each abbreviated number is treated as telephone number data. Memory 74 has ten group memories, each of which can store a maximum of fifty abbreviated numbers as a polling group.

To set abbreviated numbers and telephone numbers of to-be-called parties into memory 72, the related keys are operated in the following procedural sequence:

Firstly, SET/ABBR key 43, and then key "*" are operated. This operation completes the preparation for the abbreviated number setting. An abbreviated number, which is one of figures of "00" to "49" is entered by use of the ten keys, as is the telephone number of an opposite party. Finally, SET/ABBR key 43 is operated. At this point, the setting of one abbreviated number is completed. Each time the sequence of key operations is repeated, main processor 51 sets a telephone number and its abbreviated number in abbreviated number memory of RAM 55.

The setting of broadcast parties into broadcast group memory 73 is effected as follows:

Firstly, SET/ABBR key 43, and then asterisk key "*" and number key "#" are operated. A predetermined code, for example, "802", is then entered by use of the ten keys. With this, a fixed code for broadcast setting is entered. A group designation code of one of "0" to "9" is entered by using the ten keys. A maximum of fifty abbreviated numbers of broadcast parties, as a designated group, are entered. Finally, SET/ABBR key 43 is finally operated. In this way, one broadcast group is set. By repeating the above sequence of key operations, main processor 51 sets respective broadcast groups in memory 73 of RAM 55.

The setting of polled parties into polling group memory 74 will now be described.

Firstly, SET/ABBR key 43 is operated, and followed by the operating of asterisk key "*" and number key "#". A predetermined code, for example, "702", is then entered by use of the ten keys. In this way, a fixed code for polling setting is entered. Then, a group designation code of one of "0" to "9" is entered by, again using the ten keys. A maximum of fifty abbreviated numbers of polled parties, as a designated group, are entered. Finally, SET/ABBR key 43 is operated. At this point, the setting of one polling group is completed. By repeating the similar key operation procedure, main processor 51 executes the poll setting, in memory 74 of RAM 55, for each group.

To set a broadcast-cancelling data, RESET key 31, SET/ABBR key 43, asterisk key "*", and number key "#" are operated, and then the ten keys are operated to enter a predetermined code "801". Finally, SET/ABBR key 43 is operated. By this operation, broadcast-cancelling data is set in a specific memory area of RAM 55. The last operation of key 43 is executed within, for example, thirty seconds after key 43 is first operated.

To set memory image-print data, SET/ABBR key 43, asterisk key "*", number key "#", and the ten keys for entering "804" are operated in this order.

Figure 7:
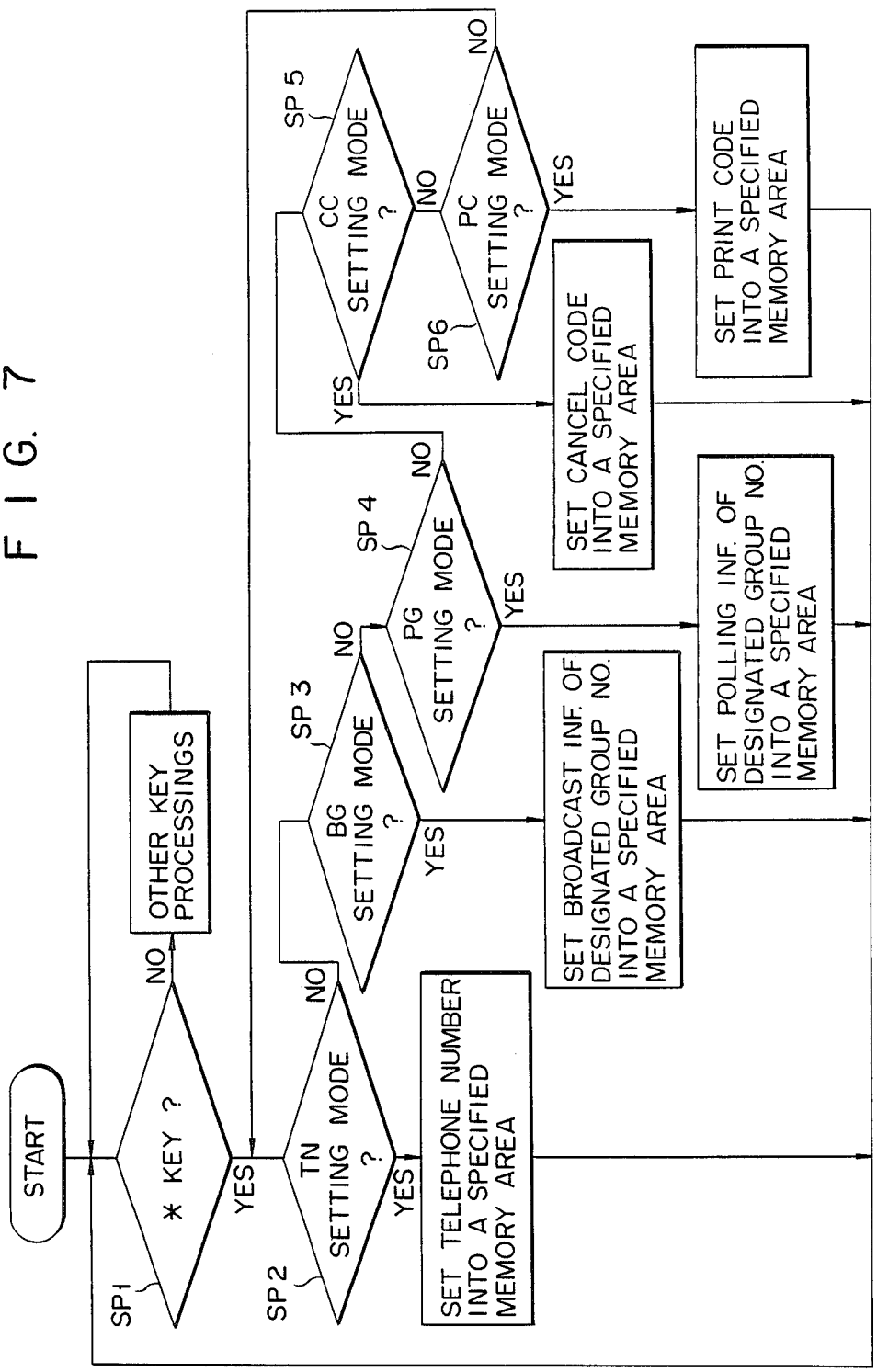
FIG. 7 is a flowchart useful in explaining the procedure for storing various data in memory areas of a one-touch dial memory.

The procedure for setting various telephone number data in one-touch dial memory 71, on the basis of the telephone number data stored in memories 72, 73 and 74, will now be described, with reference to the flowchart of FIG. 7.

The telephone number of an opposite party in one-touch dial memory 71 is set in the following way:

Firstly, asterisk key "*" is operated. An opposite party's telephone number, 7-digit numeral data, for example, is entered by use of the ten keys. One of lamps L1 to L4 is selected and lit by select key 46, to designate a column. Finally, one of one-touch dial keys 45 is operated. Thus, the setting of one telephone number is completed. By repeating the similar key procedural operation, main processor 51 sets necessary telephone numbers in one-touch dial memory 71 of RAM 55.

When main processor 51 detects in step SP1 that asterisk key "*" is operated, that is, when it detects that the operation for setting telephone number data in memory 71 starts, main processor 51 checks in step SP2 whether or not a telephone number (TN) is set, that is, whether the TN setting mode is set. If it detects that the ten keys, following asterisk key "*" have been operated, main processor 51 stores the numeral data as entered by means of the ten keys into the work memory area of RAM 55, as a telephone number. Afterwards, the telephone number data is stored in the memory area of memory 71 as designated by keys 45 and 46.

If it detects that any key other than the ten keys is operated after asterisk key "*" is operated, main processor 51 checks in step SP3 whether or not broadcast group data (BG) is set, that is, whether or not a specific code "01" has been entered by means of the ten keys, after asterisk key "*" and SET/ABBR key 43 have been operated. If the BG setting mode is detected and the answer is YES in step SP3, then a broadcast group is designated in accordance with one of numeral data "0" to "9" which is entered by operating a ten key. Next, one of lamps L1 to L4 selected by select key 46 is lit, and a memory area of memory 71 is selected, by means of keys 46 and 45. In response to the operation of key 45, main processor 51 sets the broadcast group data, which includes broadcast designation code "01" and a broadcast group code designated by the ten key, into the memory area selected by keys 45 and 46. Each time the similar operation is repeated, main processor 51 sets one item of broadcast group data into one memory area of one-touch dial memory 71 of RAM 55.

If the answer is NO in step SP3, main processor 51 checks in step SP4 whether or not polling group data (PG) is set, that is, a specific code "02" has been entered by use of the ten keys, after asterisk key "*" and SET/ABBR key 43 have been operated. If the PG setting mode is set and the answer is YES in step SP4, a polling group specified by one of numeral data "0" to "9", entered by the operation of the ten key, is designated. In a similar manner to the above, by the operation of keys 46 and 45, one of the memory areas of memory 71 is designated. In response to the operation of key 45, main processor 51 sets the polling group data, which includes a polling designation code and a polling group code designated by means of the ten keys, into a memory area of memory 71 which is designated by keys 45 and 46. Each time the similar operation is repeated, main processor 51 sets an item of polling group data into one memory area of memory 71 of RAM 55.

When a specific code "03" is entered by ten keys after asterisk key "*" and SET/ABBR key 43 are operated, it is detected in step SP5 that the broadcast-cancelling data including cancel code (CC) "03" is set or the CC setting mode is set. When a specific code "04" is entered by operating ten keys after asterisk key "*" and SET/ABBR key 43 are operated, it is detected in step SP6 that memory image print data including print code (PC) "04" is set or the PC setting mode is set. Subsequently, in a similar manner to the above, broadcast-cancelling data or memory image-print data is set in the memory area of memory 71 which is designated by keys 46 and 45.

In this way, as is shown in key data display board 48 in FIG. 4, the telephone numbers of called parties are respectively set at locations which are specified by the columns designated by lamps L1 and L2 and the rows designated by one-touch dial keys R1 to R5. Broadcast group data of groups (1) to (5) are, respectively, set at locations, which are specified by the column designated by lamp L3 and the rows designated by one-touch dial keys R1 to R5. Polling group data of groups (1) to (3) are respectively set at locations which are specified by the column designated by lamp L4 and the rows designated by one-touch dial keys R1 to R3. Broadcast-cancelling data is set at a location which is specified by the column designated by lamp L4 and the row designated by one-touch dial key R4. Memory image-print data is set at a location which is specified by the column designated by lamp L4 and the row designated by one-touch dial key R5.

Normally, main processor 51 causes display 23 to display time and date, which are derived from timer 59.

Figure 8A:
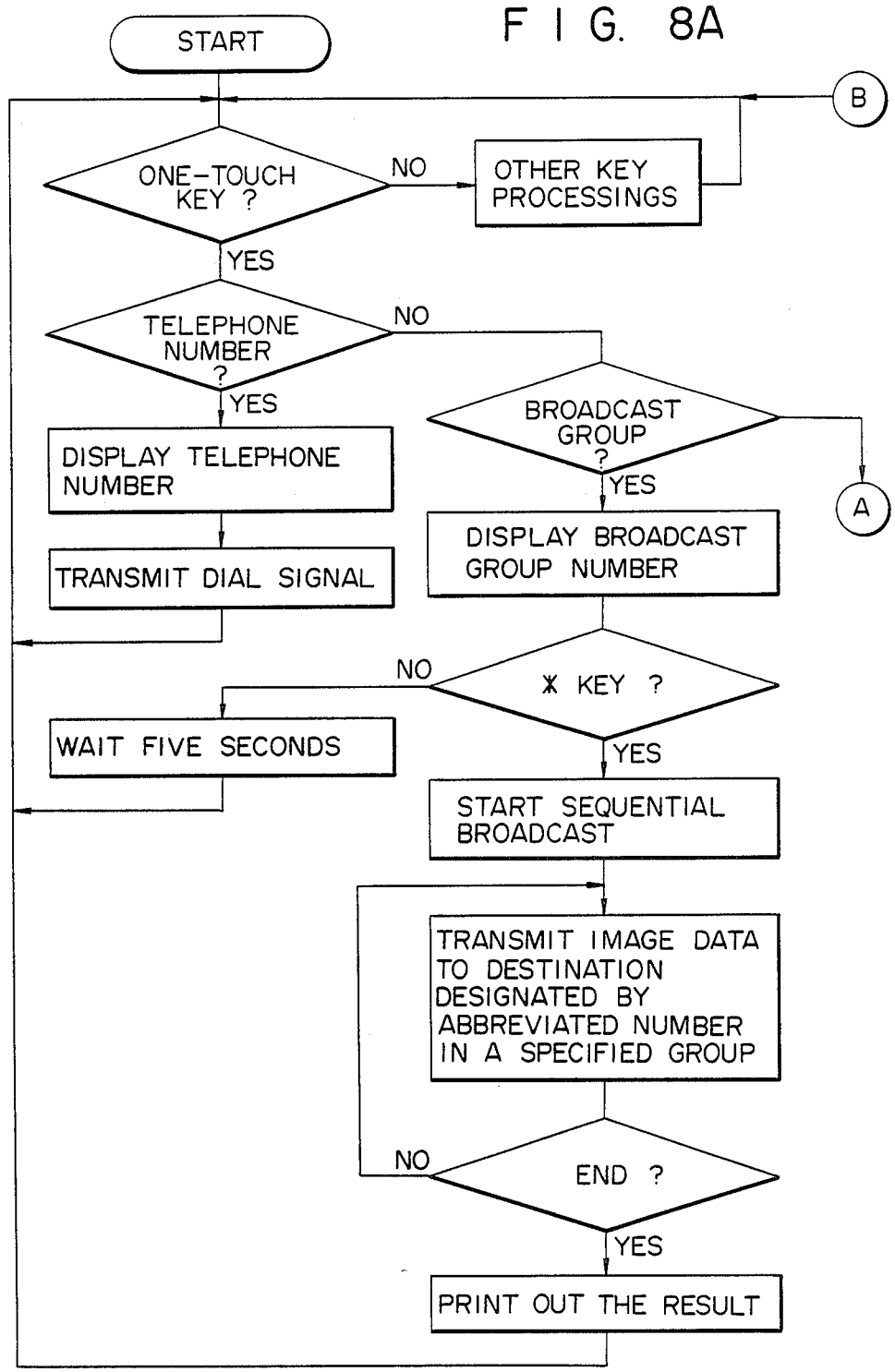
FIGS. 8A and 8B cooperate to show a flowchart explaining the operation for facsimile transmission.
Figure 8B:
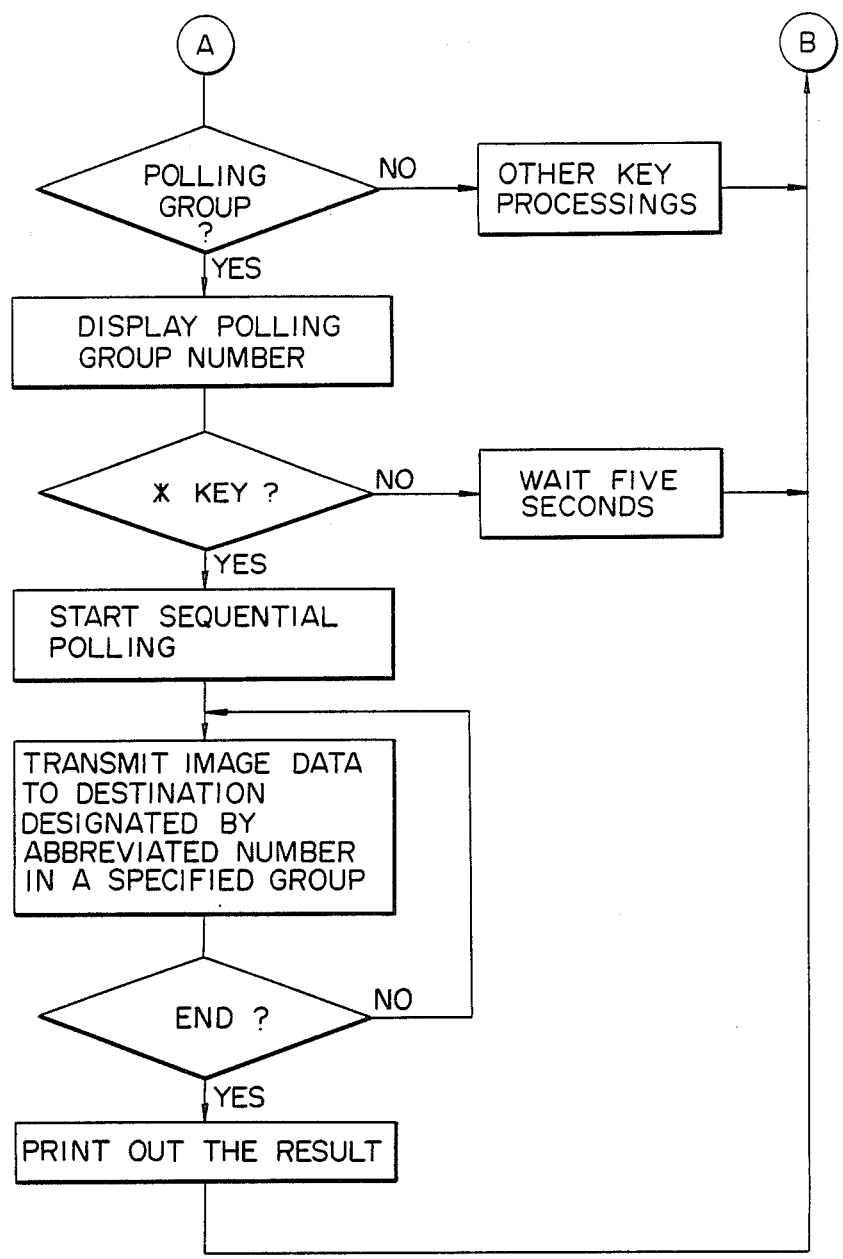

When one of one-touch dial keys R1 to R5 is operated, main processor 51 performs the key processing as shown in FIGS. 8A and 8B. If a telephone number is stored in the memory area of one-touch dial memory 71 which is designated by the operated one-touch dial key, main processor 51 decides that it is a normal one-touch dial operation, reads out the telephone number from the memory area, and displays the number by display 23. At the same time, it transmits a dialing signal to the called party.

If the memory area of one-touch dial memory 71 which is designated by an operated one-touch dial key stores broadcast group data, the broadcast group number is displayed by display 23. For example, "G1 BROADCAST" is displayed. Main processor 51 then waits for five seconds. If during this time, asterisk key "*" is operated, the sequential broadcasting of the designated broadcast group is started. If during this time, asterisk key "*" is not operated, one-touch dial key operation is cancelled.

When the sequential broadcast is started, a first abbreviated number is read out from the corresponding group memory of broadcast group memory 73, a dialing signal is transmitted to the party, as is the image data stored in RAM 56. When the transmission to one party is finished, the next abbreviated number is read out from the group memory, the dialing signal is transmitted to the corresponding party, and the image data stored in RAM 56 is transmitted in the same way. The same processings are performed for all the abbreviated numbers stored in the group memory. If a called party does not accept the call when a telephone number is dialed, the number is skipped over, and a telephone number specified by the next abbreviated number is dialed. When dialing of all the other abbreviated numbers in the group memory is completed, main processor 51 waits for three minutes, for example, and dials the skipped-over numbers again. If there are still skipped-over numbers remaining, main processor 51 waits for additional three minutes and dials the skipped-over numbers again. If, in this way, the numbers are dialed three times, but if the parties corresponding to the numbers do not accept the calls, the broadcast processing is ended, whereupon printer 54 prints out the results of the broadcast.

If the memory area of one-touch dial memory 71 which is designated by the operated one-touch dial key, stores polling group data, the polling group number is displayed by display 23. For example, "G1 POLLING" is displayed. Main processor 51 then waits for five seconds. If, during this time, asterisk key "*" is operated, the sequential polling of the designated polling group is started. If, during the five seconds, asterisk key "*" is not operated, the operation of the one-touch dial key is cancelled.

When the sequential polling is started, a first abbreviated number is read out from the corresponding memory area of polling group memory 74, and the telephone number is dialed to call the party. Then main processor 51 causes the party to transmit image data, it receives this data, and prints it out by means of printer 54. When the processing of receiving image data from one party is finished, the next abbreviated number is read out from the group memory, and the telephone number is dialed to call the corresponding party, and, in the same way as above, the image data from the called party is received, and is printed out by printer 54. In this way, the same processing is applied to all the abbreviated numbers in the group memory. In this case, if the called party fails to accept the call when the number is dialed, the number is skipped over, and a telephone number specified by the next abbreviated number is dialed. When dialing of all the other abbreviated numbers is finished, main processor 51 waits for about three minutes, for example, and dials the skipped-over numbers again. If there are still skipped-over numbers remaining, main processor 51 waits again for three minutes. When the operation is repeated three times, and if the parties still fail to accept the calls, the polling processing is ended, whereupon printer 54 prints out the results of the polling.

During the broadcast, if keys 45 and 46 are operated to designate the broadcast-cancelling data, the broadcast is interrupted at the time the transmission to the called party now in progress is ended.

If keys 45 and 46 are operated to designate the memory image-print data, the image data to be transmitted is read out from RAM 56, and is printed out.

When the normal facsimile signal is transmitted, the document to be transmitted is inserted into document inlet 28. Then, a telephone number is entered by use of the ten keys, or an abbreviated number is entered by means of SET/ABBR key 43 and the ten keys, or else one-touch dial key 45 is operated. Next, TRANSMIT key 37 on the facsimile operation panel 22A is operated. Main processor 51 reads the contents of the inserted document by means of image reader 53, and encodes the readout data by use of image data coding/decoding circuit 58. It then transmits the read-out data, as a facsimile signal, to the telephone network via facsimile modem 61. The telephone number of the called party is displayed by display 23.

In the embodiment thus arranged, when broadcast group (1) is subjected to broadcasting, one-touch column designation lamp L3 is lit by operating select key 46, and then one-touch dial key R1 is operated. At this time, display 23 displays that the broadcast of group (1) is in progress. The user confirms this display and operates asterisk key "*". The group (1) memory area of broadcast group memory 73 is designated by the one-touch data of broadcast group (1), which is read out from one-touch dial memory 71 by means of a one-touch dial key. The abbreviated numbers are read out from the memory area in the order of the first abbreviated number, and the succeeding ones, for example. The read-out abbreviated number is converted into the telephone numbers by abbreviated number memory 72. The telephone number is dialed to call the opposite party. When the called party accepts the call, the image data stored in RAM 56 is encoded by image data-coding/decoding circuit 58. The coded signal is transmitted via facsimile modem 61 to the telephone network, and to the called party. When the transmission is completed, the next abbreviated number is read out from the group (1) memory area, and in the same manner as above, it is converted into a telephone number. Then, the number is dialed to call the corresponding party. When the party accepts the call, the image data stored in RAM 56 is transmitted to the party. In this way, the same transmission processing is repetitively performed for all the abbreviated numbers stored in group (1) memory area of broadcast group memory 73, to thereby complete the transmission processing. Finally, the result of the broadcast is printed out by printer 54. The parties who accepted and those who did not accept the broadcasting may be printed out for each abbreviated number.

When polling group (1) is subjected to the polling, one-touch column indication lamp L4 is lit by select key 46, and then one-touch dial key R1 is operated. At this time, display 23 displays that the polling of group (1) is performed. The user sees the display, and operates asterisk key "*". The group (1) memory area of polling group memory 74 is designated by the one-touch data of polling group (1), which is read out from one-touch dial memory 71 through the operation of a one-touch dial key. The abbreviated numbers are successively read out from the memory area, starting from the first one, for example.

The read-out abbreviated numbers are converted into telephone numbers by abbreviated number memory 72. One telephone number is dialed to call the opposite party. When the party accepts the call, main processor 51 requests the party to transmit the image data. This image data is received via telephone network and facsimile modem 61, and is decoded by image data-coding/decoding circuit 58. Then, printer 54 is driven to print out the received image data. Upon completion of this processing, the next abbreviated number is read out from group (1) memory area. In the same manner as above, the abbreviated number is converted into a telephone number, and then the telephone number is dialed. When the party accepts the call, the image data transmitted from the party is printed out by printer 54. In this way, the same transmission processing is repetitively performed for all the abbreviated numbers stored in group (1) memory of polling group memory 74 to complete the polling processing. Finally, the result of the polling is printed out by printer 54. The parties who accepted and those who did not accept the polling may be printed out for each abbreviated number.

As has been described above, broadcasting and polling can be designated by means of one-touch dial keys. Consequently, these two operations are extremely easy to perform. Only the display is performed when the one-touch dial key is operated. That is, the actual broadcasting and polling are not started until asterisk key "*" is operated. Therefore, if another one-touch dial key is erroneously operated, there is no possibility that the transmission will be started merely by way of an erroneous operation. After confirming the contents of the transmission by the display, the user can correctly start the transmission. Since the broadcasting and polling are performed by using the one-touch dial key, there is no need for a special key to be provided. Therefore, the number of keys arranged on the operation panel 22, especially on telephone operation panel 22, can be reduced. This makes it possible to reduce the panel area and the size of the facsimile apparatus. In other words, the compact apparatus can be realized.

Twenty one-touch information items can be selectively designated by combinations of five one-touch dial keys 45 and four one-touch column-indication lamps 47 selected by select key 46 in this way, the number of one-touch dial keys used can be reduced. Therefore, it is possible to provide one-touch dial keys separately from one-touch information display board 48. Display board 48 can be made smaller. Furthermore, one-touch dial key can be made comparatively large, thereby improving the operability.

As has been described above, in the above-mentioned embodiment, twenty one-touch data items can be designated. Alternatively, depending on the locations of the one-touch data designated, the indication labels on key data board 48 may be rearranged as shown in FIG. 9, for example.

While the present invention has been described by way of one specific embodiment, it should be understood that the invention is not limited to such a specific embodiment.

In the above embodiment, five one-touch dial keys 45 are provided. Twenty one-touch data items are designated by the combination of these keys 45 and four one-touch column indication lamps 47 which are lit by select key 47. As an alternative, one-touch dial keys may be provided for all of the twenty one-touch data items, in a one-to-one correspondence. In this case, one-touch dial keys are assembled into one-touch data display board 48. In the above embodiment, the number of one-touch data items is twenty. It is evident, however, that the number of data items is not limited to this.

The facsimile apparatus of the above embodiment has both broadcasting and polling functions. It should be understood that provision of either of these functions is within the scope of this invention.

It should further be noted that the telephone number to be stored in memory 71 may be replaced by abbreviated numbers.

What is claimed is:

1. A facsimile apparatus comprising:
   first memory means having a plurality of memory areas each for selectively storing telephone number data or telephone number group data containing a discrimination code;
   first key-in means for selectively designating the memory area of said first memory means;
   second memory means for storing at least one item of telephone number group data, and plural items of data corresponding to said telephone number group data; and
   control means which, when it detects that one of said memory areas of said first memory means, which stores the telephone number group data, is designated, sequentially reads out corresponding telephone number data from said second memory means, based on the discrimination code contained in the selected telephone number group data, transmits a dialing signal based on the read-out telephone number data, and further, allows the transmission of image data to and from the called party designated by the telephone number data.

2. The facsimile apparatus according to claim 1, wherein said telephone number group data contains broadcast group data, said control means comprises an image reader for reading the image data of a document, and a control unit which, when broadcast group data is designated by said first key-in means, sequentially reads out telephone number data from said second memory means, according to the discrimination code of the broadcast group data designated, and executes a broadcast function based on the telephone number data and the image data received from said image reader.

3. The facsimile apparatus according to claim 2, wherein said telephone number group data further contains polling group data, said control means has a printer, and when polling group data is designated by said first key-in means, said control unit sequentially reads out telephone number data from said second memory means, based on the discrimination code of the polling group data designated, transmits dialing signals based on the read-out telephone number data, and prints out the received image data by means of said printer.

4. The facsimile apparatus according to claim 3, further comprising display means for displaying the dialed telephone number.

5. The facsimile apparatus according to claim 4, wherein said second memory means comprises a first memory for storing abbreviated numbers and corresponding telephone numbers, and a second memory, for storing the discrimination code of each of said telephone number group data, and a plurality of corresponding abbreviated numbers.

6. The facsimile apparatus according to claim 5, further comprising second key-in means, said second key-in means being operated so as to generate telephone number data or telephone number group data, and storing the generated data in the memory area of said first memory means which is designated by said first key-in means.

7. The facsimile apparatus according to claim 4, further comprising second key-in means, said second key-in means being operated so as to generate telephone number data or telephone number group data, and storing the generated data in the memory area of said first memory means which is designated by said first key-in means.

8. The facsimile apparatus according to claim 3, wherein said second memory means comprises a first memory for storing abbreviated numbers and corresponding telephone numbers, and a second memory, for storing the discrimination code of each of said telephone number group data, and a plurality of corresponding abbreviated numbers.

9. The facsimile apparatus according to claim 3, further comprising second key-in means, said second key-in means being operated so as to generate telephone number data or telephone number group data, and storing the generated data in the memory area of said first memory means which is designated by said first key-in means.

10. The facsimile apparatus according to claim 2, further comprising display means for displaying the dialed telephone number.

11. The facsimile apparatus according to claim 2, wherein said second memory means comprises a first memory for storing abbreviated numbers and corresponding telephone numbers, and a second memory, for storing the discrimination code of each of said telephone number group data, and a plurality of corresponding abbreviated numbers.

12. The facsimile apparatus according to claim 2, further comprising second key-in means, said second key-in means being operated so as to generate telephone number data or telephone number group data, and storing the generated data in the memory area of said first memory means which is designated by said first key-in means.

13. The facsimile apparatus according to claim 1, wherein telephone number group data contains polling group data, and said control means comprises a printer and a control unit which, when polling group data is designated by said first key-in means, sequentially reads out the corresponding telephone number data from said second memory means, based on the discrimination code of the designated polling group data, transmits dialing signals based on the read-out telephone number data, and prints out the received image data by means of said printer.

14. The facsimile apparatus according to claim 1, further comprising display means for displaying the dialed telephone number.

15. The facsimile apparatus according to claim 1, wherein said second memory means comprises a first memory for storing abbreviated numbers and corresponding telephone numbers, and a second memory, for storing the discrimination code of each of said telephone number group data, and a plurality of corresponding abbreviated numbers.

16. The facsimile apparatus according to claim 1, further comprising second key-in means, said second key-in means being operated so as to generate telephone number data or telephone number group data, and storing the generated data in the memory area of said first memory means which is designated by said first key-in means.

* * * * *